SINGLE FRAME FACSIMILE SYSTEM

Filed Dec. 31, 1954 4 Sheets-Sheet 1

INVENTOR
JOHN HAYS HAMMOND, JR.
BY [signature]
ATTORNEY

SINGLE FRAME FACSIMILE SYSTEM

Filed Dec. 31, 1954 4 Sheets-Sheet 2

INVENTOR
JOHN HAYS HAMMOND, JR.
BY [signature]
ATTORNEY

SINGLE FRAME FACSIMILE SYSTEM

Filed Dec. 31, 1954

INVENTOR
JOHN HAYS HAMMOND, JR.
BY [signature]
ATTORNEY

INVENTOR
JOHN HAYS HAMMOND JR.
BY [signature]
ATTORNEY 2,889,399
Patented June 2, 1959

2,889,399

SINGLE FRAME FACSIMILE SYSTEM

John Hays Hammond, Jr., Gloucester, Mass.

Application December 31, 1954, Serial No. 479,054
15 Claims. (Cl. 178—5.1)

This invention relates to facsimile transmission systems and particularly to privacy facsimile systems which can be operated over various distances by radio or cable.

An object of the invention is to provide an improved rapid facsimile system which can be adapted to transmission over long distances by a radio carrier of relatively low frequency or over shorter distances by directed or undirected high-frequency radio carrier waves.

Another object is to provide means for scrambling or coding the signal so that the message can be received and understood only on a receiver of special design and then only when the receiver selection elements are set for the particular combination of settings used at the transmitter.

In the present invention the optical image of the message is focused on the screen of an iconoscope or equivalent pick-up tube and is scanned by the electron beam once for the transmission of a single frame for each message. The synchronized scanning of the electron beam in the cathode-ray viewing tube of the receiver reproduces the message on the screen of the tube which may then be automatically photographed.

The rate of scanning may be made low so as to require a relatively narrow band of signal or video frequencies. In such a case the message can be transmitted over long distances by modulation of a relatively low-frequency carrier wave. The time for the completion of the scanning cycle for one frame and hence the time of transmission may be several seconds. On the other hand, if the scanning rate is high the signal-frequency band width would be relatively large, requiring a carrier wave of very high frequency. For special purposes transmission with high-speed scanning can be made by directed microwaves or by ultra high frequency carrier waves, which are reliably received only over relatively short distances. In this latter case the scanning cycle and the time of transmission of a message may be a small fraction of a second. The rate of scanning may have any value within a wide range depending upon the conditions of service.

The invention includes means at the transmitter by which the message may be coded or scrambled in any one of a plurality of ways, and means at the receiver by which the message is restored if the decoder elements are set for the correct combination. The scrambling or coding method, which is fully described in the copending application Serial Number 478,568, filed December 30, 1954, entitled Television Privacy System, consists in delaying the signal or the starting of a horizontal sweep for certain horizontal lines which has the effect of offsetting horizontally the brightness pattern of these certain horizontal lines as seen on the cathode-ray tube of a receiver which has no decoder. Other methods of encoding can also be used simultaneously to give added security. These methods may consist in offsetting vertically certain selected horizontal lines as in reversing the brightness sense for certain chosen horizontal lines. At the receiver the decoder, when properly set, introduces complementary delays or the equivalent and complementary brightness reversals so as to restore the alignment and brightness pattern of the original image.

The invention includes means for simultaneously starting the scanning processes in the transmitter and receiver, for synchronizing the horizontal sweeps at both stations, and for providing blanking voltage waves for interrupting the electron beams when not required for message transmission and reception. To render the facsimile transmission system completely automatic except for introducing the subject at the transmitter and pushing a button, automatic electrical controls may be provided at the receiver for opening and closing the shutter of a camera for photographing the message on a film and for advancing the film for the next message.

The invention also consists in certain new and original features of construction and combinations of parts hereinafter set forth more in detail.

Although the novel features which are believed to be characteristic of this invention will be particularly pointed out in the claims appended hereto, the invention itself, its objects and advantages, the mode of its operation and the manner of its organization may be better understood by referring to the following description taken in connection with the accompanying drawing forming a part thereof, in which Fig. 1 is a chart showing the various electrical waves at the transmitter involved in the practice of this invention;

Figures 4A, 4B, 5:
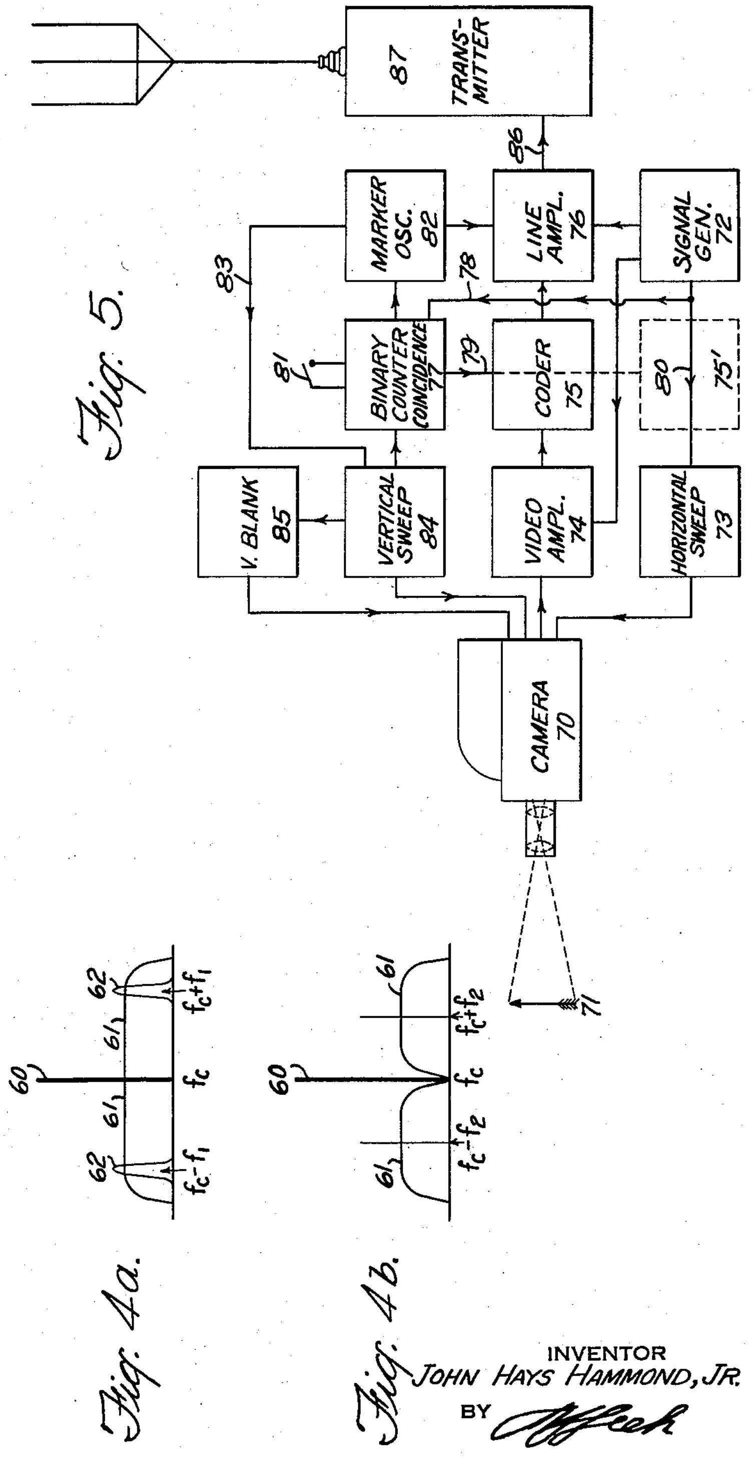

Figs. 4*a* and 4*b* are charts showing the radio spectrum of the transmitted wave.

Fig. 5 is a block diagram showing the essential parts of a transmitter; and

Figure 6:
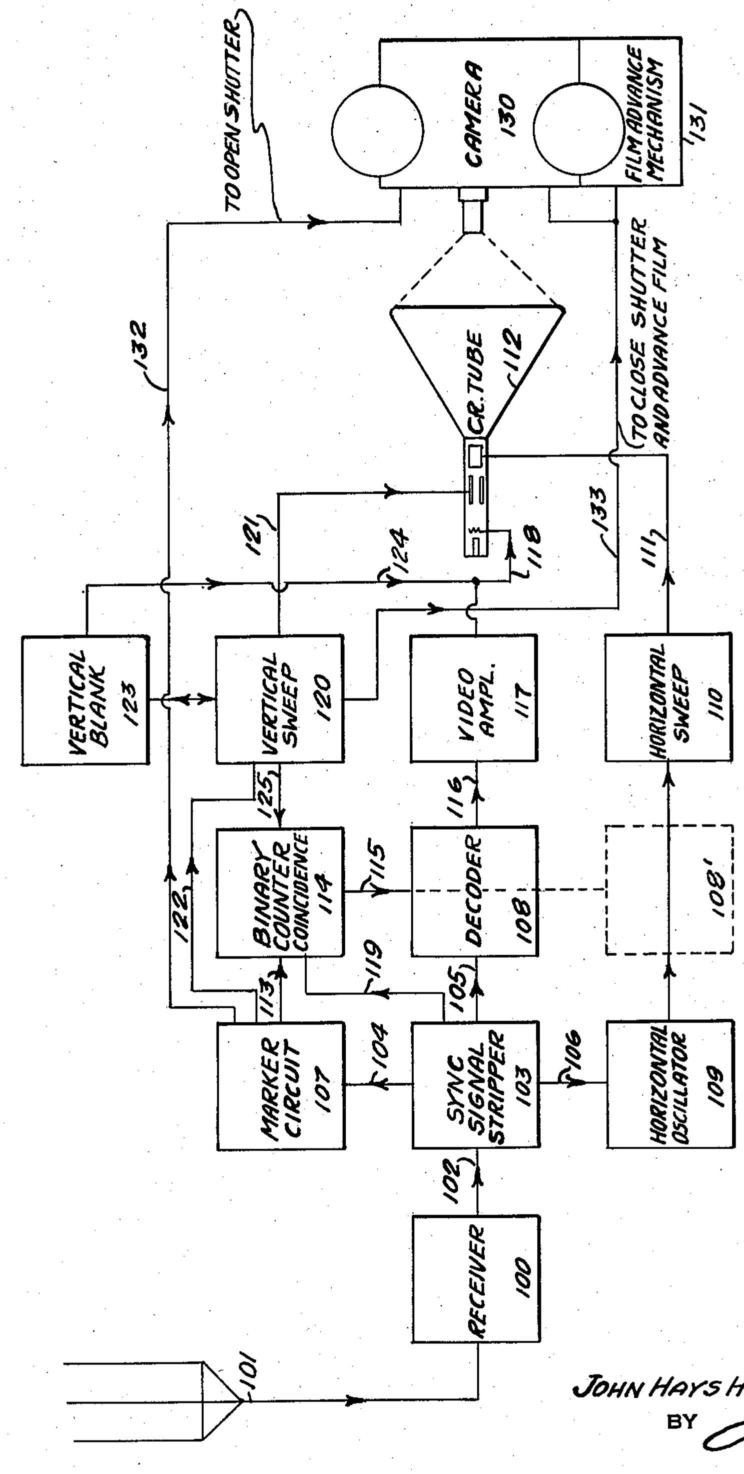

Fig. 6 is a block diagram showing the essential parts of a receiver.

In the following description parts will be identified by specific names for convenience but they are intended to be as generic in their application to similar parts as the art will permit.

Figure 1:
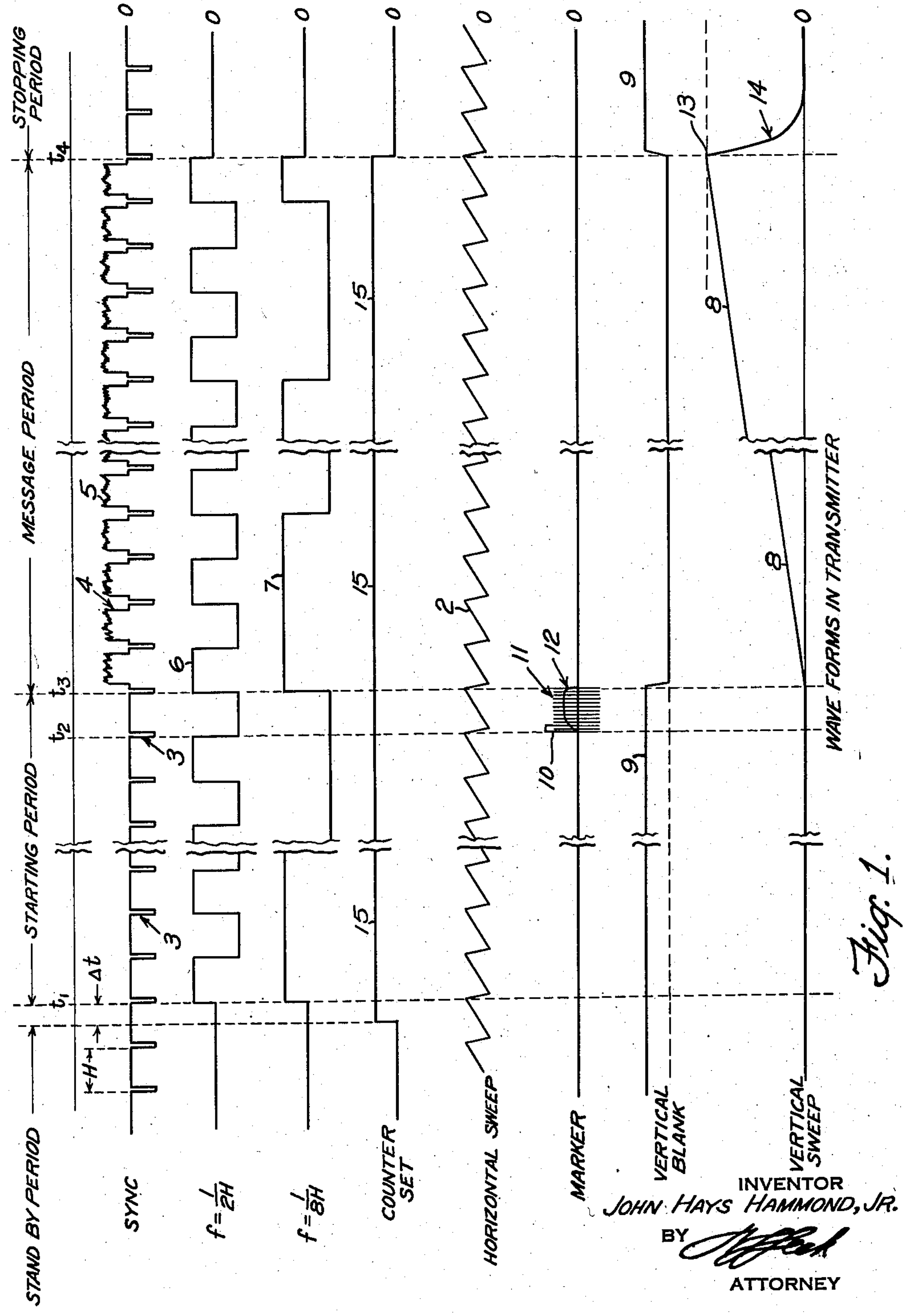
Figure 2:
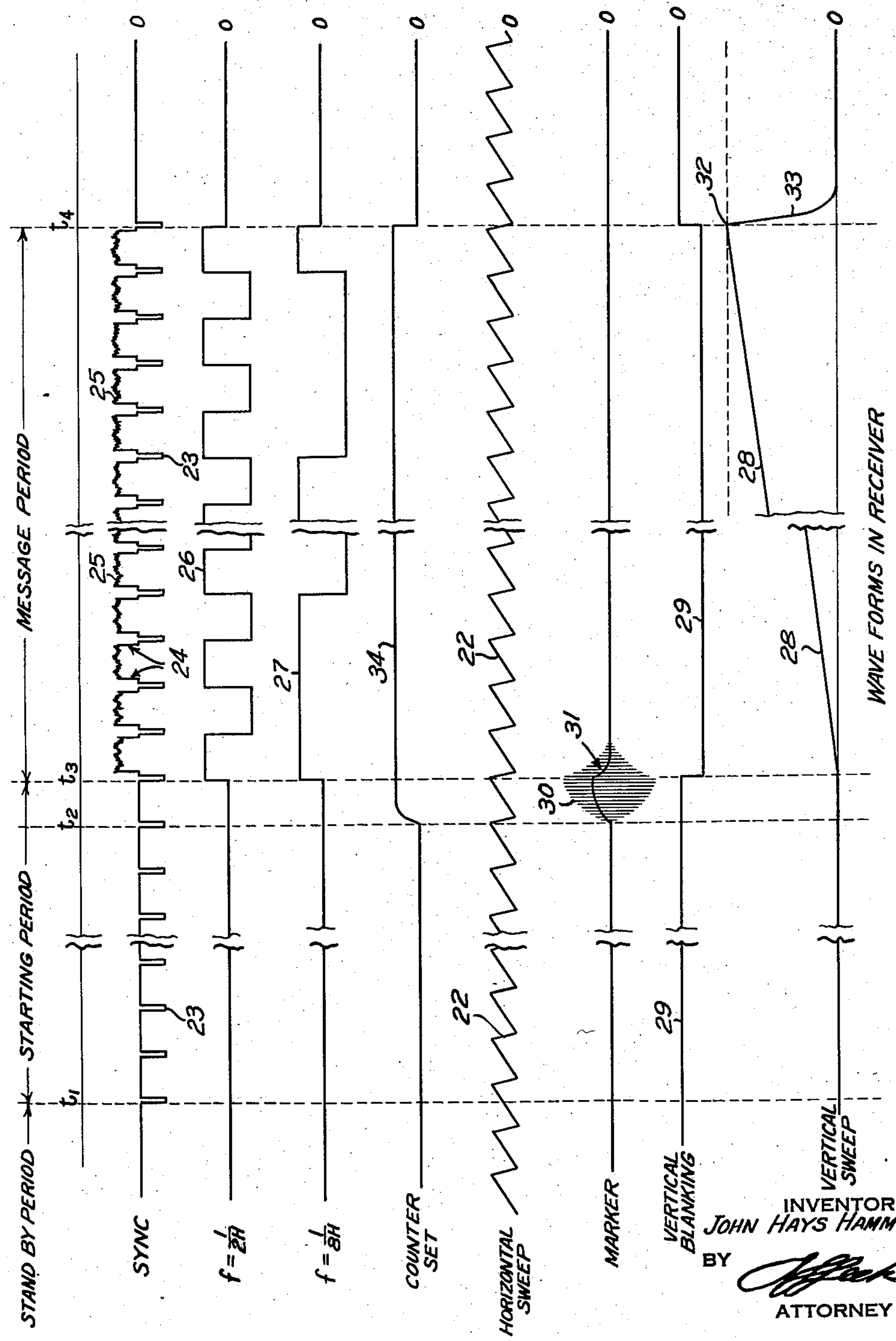
Fig. 2 is a chart showing the electrical waves at the receiver.

The invention comprises a number of cooperating steps which occur in definite time relationship and are caused to take place through the action of certain electrical waves. The waves required at the transmitter are shown in Fig. 1 and at the receiver in Fig. 2, plotted on horizontal time axes. For convenience in describing the sequence of steps, the time cycle is divided into four periods as follows; the standby period before $t_1$; the starting period from $t_1$ to $t_3$; the message period from $t_3$ to $t_4$; and the stopping period immediately after $t_4$ which merges into the standby period before the next message is sent.

During the message period the electron beam in the iconoscope or equivalent pick-up device is caused to scan the optical image of the subject on the screen of the pick-up tube in horizontal lines by reason of the saw-tooth electrical wave 2, which has a period of H seconds. This saw-tooth wave is derived from a stable master oscillator from which is also derived the synchronizing pulses 3. The pulses 3 are transmitted to the receiver as pulses 23 for synchronizing the receiver horizontal sweep wave 22. Horizontal blanking shoulders 4, also derived from the synchronizing oscillator, are used to blank off the electron beam in the pick-up tube during the horizontal fly-back time. This blanking wave is transmitted to the receiver as wave 24 in Fig. 2.

The video or message signal from the screen of the pick-up tube in the transmitter is superimposed on the synchronizing and blanking wave, and is shown as 5 in Fig. 1. This message wave 5 when received constitutes message wave 25 in Fig. 2.

A binary counter at the transmitter, comprising several stages having periods of 2H, 4H, 8H, etc., respectively, is controlled by the synchronizing wave 3 so that all counter waves start at $t_1$. The wave of the 2H counter is shown at 6 and of the 8H wave at 7 in Fig. 1. The 4H wave and waves of longer periods than 8H, if used, start in phase with waves 6 and 7 at $t_1$.

The binary-counter waves acting through coincidence circuits and electronic switches enable any horizontal sweep to be selected and then delayed by one, two, or three units of delay time. This produces horizontal "offsets" of certain selected lines. An alternative method of obtaining horizontal offset consists in delaying the video information for the chosen lines. In addition to horizontal offsets, vertical offsets and/or sense reversals of certain selected horizontal lines can be produced and controlled by the binary counters.

A linearly rising voltage or current 8, starting at $t_3$, provides the vertical sweep of the electron beam in the pick-up tube at the transmitter. A vertical-blanking wave 9 unblanks the electron beam in the pick-up tube during the message period. A similar vertical-sweep wave 28 and blanking wave 29 are produced at the receiver and synchronized with the corresponding waves at the transmitter by means to be described.

In the transmitter during the stand-by period before $t_1$ the synchronizing pulses 3 and the horizontal-sweep wave 2, derived from pulses 3, are active and are started when the whole modulating system is turned on. Also the vertical-blanking wave 9 in the transmitter blanks out the recording electron beam during this period. In the receiver during the stand-by period the horizontal-sweep wave 22, started by turning on the system, is uncontrolled and operating at a frequency slightly higher than that of wave 2 in the transmitter. The electron-beam blanking-wave 29 for the cathode-ray tube is also in the normally blanked condition.

When a message is to be sent, a push button or the equivalent at the transmitter is closed at time $t_1-\Delta t$, where $\Delta t$ is less than H. This operation actuates counter-set wave 15 which sets the counters ready for operation. The first synchronizing pulse 3 after the counters are set starts the binary-counter stages all in phase at $t_1$. This pulse may be used also to turn on the transmitter so that the pulse train 3 is sent to the receiver. At the receiver the received synchronizing pulses 23 pull the horizontal-sweep wave 22 into synchronism.

During the starting period, coincidence circuits, controlled by the binary counter, produce a pulse 10 at time $t_2$ after $(8n-1)$ H seconds, where $n$ is a small integer sufficient to allow the wave 29 at the receiver to be stably synchronized. This same pulse 10 starts a blocking oscillator, or the equivalent, of frequency $f_1$ which oscillates for approximately H seconds as shown at 11 in Fig. 1. A marker pulse 12 is thus produced by rectification of oscillations 11. The end of pulse 12 starts the vertical-sweep 8, which may be produced by a condenser charged through a saturated pentode or by any other equivalent means. The initiation of current or voltage 8 causes voltage 9 to drop, thus unblanking the electron beam in the pick-up tube. Video signals 5, initiated by the released electron beam, are added to the waves 3 and 4 during the message period.

In the receiver, wave 11 builds up oscillations 30 in a highly selective circuit and produces marker pulse 31 by rectification of wave 30. The beginning of pulse 31 opens the camera shutter and actuates the counter-set pulse 34 which prepares the binary counter for operation. The next pulse of pulses 23 after time $t_2$ starts the binary counter at $t_3$ which produces waves 26, 27, and others not shown, in the same phase and sequence as the corresponding counter waves 6 and 7 at the transmitter. The termination of pulse 31 starts the vertical sweep 28, which in turn decreases the blanking wave 29 thus releasing the electron beam in the cathode-ray viewing tube.

The decoding of the scrambled message at the receiver is controlled by the binary-counter waves 26, 27, and the intermediate and other waves not shown, which are operating in synchronism with the corresponding transmitter counter waves. Through the action of coincidence circuits and electronic switches, controlled by the binary counter, complementary delays and sense reversals are introduced in the proper horizontal lines to restore the alignment of the horizontal sweeps and the brightness pattern to correspond with the original message. The manner of operation of the encoding and decoding circuits is more fully described in the copending application above mentioned.

When the vertical sweep 8 in the transmitter attains an adjustable level 13 sufficient to cover the whole message, a trigger circuit resets the vertical sweep in a decreasing voltage or current 14. This change in slope of sweep 8 restores the blanking voltage 9. The pulse 14 also stops the binary counter by reducing wave 15, and turns off the transmitter. The synchronizing pulses 3 and the horizontal-sweep wave 2 continue.

At the receiver the change in slope of the vertical sweep, on attaining a prescribed level 32, restores the blanking voltage 29, and drops wave 34 to stop and reset the binary counter. Pulse 33, caused by the return of voltage 28 to zero, closes the camera shutter and advances the film for the next exposure. Wave 22 then continues in an uncontrolled free mode.

Figure 3:
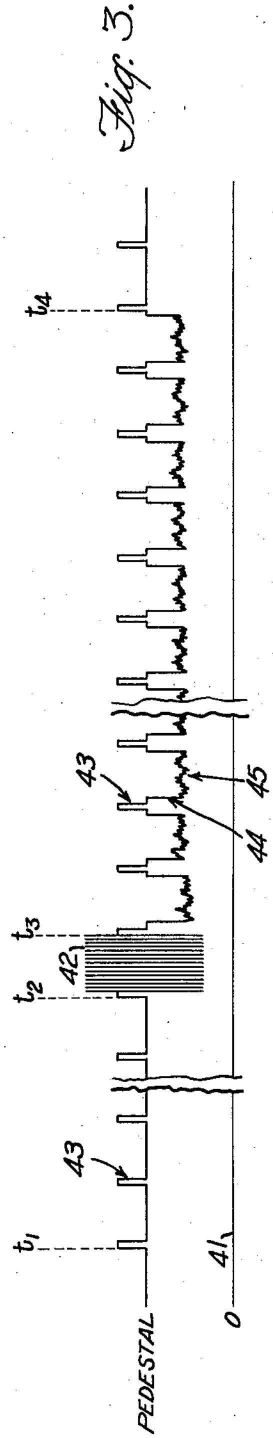
Fig. 3 is a chart showing the waves sent from the transmitter to the receiver as modulation of the carrier wave.

The composite wave from the modulator system is used to modulate a carrier wave of frequency $f_c$ by amplitude modulation or to frequency modulate a sub carrier which is then used to amplitude modulate a carrier of frequency $f_c$. The modulation envelope is shown in Fig. 3 referred to the zero level 41. The composite wave comprises the synchronizing pulses 43 corresponding to pulses 3 in Fig. 1, and the marker pulse 42 corresponding to pulse 12. During the message period the modulation includes, in addition to pulses 42 and 43, the blanking shoulders 44 and the video signal 45.

Fig. 4*a* shows the radio spectrum of the emission when amplitude modulation of the carrier is employed. Fig. 4*b* shows the spectrum when frequency modulation of a sub carrier is used. The video and synchronizing signals are contained in the side bands 61. The marker pulse of frequency $f_1$ appears as narrow side bands 62 at radio frequencies $f_c-f_1$ and $f_c+f_1$ in Fig. 4*a*. These side bands 62 are shown near the outer limits of side bands 61 but may be located at any suitable point either within or outside the side bands 61. They do not exist during the message period. For frequency modulation the marker spectrum is contained in the side bands 61 of Fig. 4*b*.

The band width of the whole spectrum shown in Fig. 4*a*, which is twice the video-signal band width for simple amplitude modulation, is related to the number of horizontal lines in a frame and the time for scanning a frame. It is well known that in television a video band width of about 4.5 megacycles is required to give good resolution when the frame time is 1/30 second and the frame has 525 horizontal lines. From these data the following formula can be expressed relating W the video band width in kilocycles, T the frame time in seconds, N the number of lines per frame, and $f_H$ the horizontal sweep frequency.

$$W=\frac{N}{KT}=\frac{f_H}{K}$$

where K has a value from 3.5 to 4 for the aspect ratio of 4/3 used in television. For a given value of N the band width W is inversely proportional to T. If the carrier frequency $f_c$ is very high, as for example 100 mc., the fractional band width of the spectrum is 9 percent. While this fractional band width is large it may be allowed in the high-frequency ranges, but the reception distance for such high frequencies is approximately line-of-sight distances and hence generally less than 100 miles. To obtain a narrower spectrum for transmission over carrier waves of say from 5 to 30 megacycles, which are reliably received over long distances, the band width W must be reduced. This results in a larger value of T, and a smaller value of $f_H$. If W is 5 kilocycles, the value of $f_H$ is 17.5 cycles per second, and for N equal to 525 the time T of one frame is 30 seconds.

In the practice of this invention no specific values of N and W are assumed since the value of W depends upon the value of $f_c$ and the amount of radio traffic in the region of the radio spectrum adjacent to $f_c$. However, the value of W is made as large as possible considering interference to reliable facsimile transmission caused by other neighboring radio transmission, and also interference to the neighboring radio transmissions caused by the intermittent short-time facsimile transmission.

The invention has been described as a combination of steps or functions expressed in terms of electrical waves which are caused to cooperate in a definite time sequence. The means for producing the required electrical waves comprise well known circuits or special circuits described in the copending application above mentioned. These circuits, while being well known, may take on different forms and be differently interconnected to produce the functions of the invention. An example of the manner in which the circuits may be associated is given in block-diagram form in Fig. 5 for the transmitter, and in Fig. 6 for the receiver.

The operation of the transmitter illustrated in Fig. 5 will be described by reference to the actuating voltage waves shown in Fig. 1. A television-type camera 70 comprises an iconoscope or equivalent pick-up device and lens for focusing the image of a subject 71 on the light-sensitive screen of the pick-up tube. The electron beam in the pick-up tube is controlled by horizontal- and vertical-sweep voltages 2 and 8, and vertical-blanking voltage 9 as described with reference to Fig. 1. The means for producing these voltage waves are included in blocks 73, 84, and 85, respectively, and are well known in the art.

Block 73 contains a saw-tooth wave generator for supplying wave 2. This sweep generator is controlled by pulses 3 from the master synchronizing generator contained in block 72.

Block 84 contains a similar saw-tooth sweep generator but operates to give a single linear sweep voltage 8. This generator is started through line 83 by a pulse 12 derived from the marker-pulse oscillator in block 82. The vertical sweep generator in block 84 controls the vertical-blanking wave 9 produced by simple well-known circuits contained in block 85.

Block 72, as previously mentioned, contains the master synchronizing generator. This may consist of a simple sine-wave oscillator of the horizontal-sweep frequency or an oscillator operating at a frequency many times higher than the horizontal sweep frequency. If the oscillator frequency is greater than the horizontal sweep frequency, the sharp horizontal pulses 3 are produced by multivibrators which divide the oscillator frequency by a suitable integer. Block 72 also contains circuits for generating the blanking shoulders 4. These blanking shoulders serve to control the video amplifier contained in block 74.

Block 77 contains a binary counter with, for example, three stages operating at frequencies $$\frac{1}{H}, \frac{1}{2H}, \text{ and } \frac{1}{4H}$$

The counter stages are timed by pulses 3 from block 72 through line 78. Block 77 also contains coincidence tubes and electronic switches by which a pulse from the counter can be gated at any one of the eight pulses of wave 3 within the cycle of wave 10. These selected pulses, acting through line 79 upon the encoder in block 75, switch in time delays in the video signals for certain horizontal lines. Or if the method of introducing offset by delaying the time of starting of certain horizontal sweeps is used, then the encoder in block 75 is interposed in line 80 between blocks 72 and 73 as block 75' instead of between blocks 74 and 76. The push button or switch 81, when closed, sets the counter ready for operation by impressing wave 15. The circuits in blocks 77 and 75 are fully described in the co-pending application above mentioned.

Block 82 contains a blocking oscillator or equivalent which produces wave 11 at frequency $f_1$. This oscillator is started by a coincidence pulse 10 from block 77. The sine-wave voltage from the oscillator is fed into the line amplifier in block 76. A pulse 12, produced by pulse 11 in a suitable circuit in block 82, acting through line 83, initiates the vertical-sweep generator contained in block 84.

The output of the line amplifier in block 76, through line 86, modulates a transmitter 87. The output of the transmitter is shown in Figs. 3 and 4.

Refer now to Fig. 6, which shows the essential parts of a receiver. Block 100 is a receiver, preferably of the superheterodyne type, capable of receiving the spectrum of Fig. 4 as picked up by the antenna 101. The output of this receiver passes through line 102 to block 103 and comprises all frequencies contained in the side bands 61 and 62 of Fig. 4. Block 103 contains well known circuits for separating the composite signal into three parts. The marker pulse 30 is conducted by line 104 to block 107. The video signal 25 is conducted by line 105 to block 108. The synchronizing signal 23 is conducted by line 106 to block 109.

Block 109 contains an oscillator, operating approximately at a frequency $$\frac{1}{H}$$

which is pulled into step or synchronized with the corresponding transmitter oscillator when signal 23 is received.

Block 110 contains circuits of well known type to produce the saw-tooth wave 22 from the output of oscillator 109. This saw-tooth wave is conducted by line 111 to the horizontal deflecting means of the cathode-ray tube 112, and provides the horizontal sweep of the electron beam of tube 112.

Block 107 contains a tuned circuit resonant to the marker wave 30, and a detector which gives wave 31. A differentiating circuit, also contained in block 107, gives a pulse over line 113 which initiates the counter-set wave 34 for the binary counter contained in block 114 which is similar to the counter at the transmitter. The binary counter in block 114 is timed by pulses 23 from block 103 through line 119. The binary counter controls coincidence circuits and electronic switches which can select any event at 0H, 1H, 2H, up to 7H within a cycle of the lowest-frequency stage of the binary counter. These selected events control, by line 115, the decoder contained in block 108. By circuits in block 108, fully described in the copending application above mentioned, time delays of one, two, or three units of delay are introduced in the video information for certain selected horizontal lines. The coded signals are conducted by line 116 to the video amplifier in block 117 and by line 118 to the control grid of tube 112.

Block 120 contains means for producing the linear rise of voltage or current shown as wave 28, and may be similar to the corresponding generator in block 84 of the transmitter. This vertical-sweep wave 28 is conducted by line 121 to the vertical deflecting means for the tube 112. The circuits in block 120 are started by a pulse produced at the end of pulse 31, by the differentiating circuits in block 107, and are conducted to block 120 by line 122.

Block 123 contains circuits for producing the vertical-blanking wave 29. This circuit is controlled by wave 28 from block 120. The blanking wave acts upon the control grid of tube 112 by way of lines 124 and 118.

The pulse 33 through line 125 resets the binary counter in block 114 by changing the counter-set wave 34.

As indicated for the transmitter, the encoder may be used to delay the starting time of certain horizontal sweeps instead of delaying the video information for these sweeps. In this case the decoder in block 108, still controlled through line 115 by the binary counter, would be interposed between blocks 109 and 110, as shown by block 108' instead of between blocks 103 and 117 as shown in Fig. 6.

A camera 130 is disposed to photograph the image on the screen of the cathode-ray tube 112. The marker circuit in block 107 is connected by a line 132 to open the camera shutter at the beginning of the marker pulse.

Block 131 contains mechanism for advancing and processing the camera film. The end of the vertical sweep pulse acts by line 133 to close the camera shutter and to advance the film for processing.

Although a specific embodiment of this invention has been shown herein, it is to be understood that the invention is not limited thereto but may be embodied in various forms as will be apparent to a person skilled in the art.

What is claimed is:

1. A facsimile transmission system comprising a transmitter and a receiver, each having image-scanning electron beams controlled by horizontal- and vertical-sweep waves, and transmitter having means to produce and transmit synchronizing pulses, said transmitter and receiver each having counter means for counting said synchronizing pulses, said transmitter having means to start from an original inoperative condition said transmitter counter means, means including an oscillator connected to said transmitter counter means responsive to a pulse applied to said oscillator from said transmitter counter means when started to produce and transmit a marker pulse at a predetermined time to control said vertical sweep wave at said transmitter, means to unblank said electron beam at said transmitter to produce and transmit a video signal and horizontal-blanking pulses during said transmitter vertical sweep, and means to restore all transmitter circuits to original condition when the vertical-sweep pulse at said transmitter attains a predetermined magnitude; said receiver having means to synchronize the horizontal-sweep wave at said receiver in response to the reception by said receiver of said synchronizing pulses, means to receive said marker pulse and responsive to said marker pulse to start from an original inoperative condition the receiver counter in step with the transmitter counter, means responsive to the received marker pulse and synchronizing pulses to start from an original inoperative condition the receiver vertical sweep, unblank the receiver electron beam, and receive a video signal to control the receiver electron beam for reproducing the image, and means to return all receiver circuits to original condition when the receiver vertical-sweep pulse attains a predetermined magnitude.

2. A single-frame facsimile transmission system comprising a transmitter and a receiver, said transmitter having image-scanning means including means producing a horizontal sweep wave, horizontal synchronization pulses, and a vertical sweep pulse, and having counter means to count said horizontal synchronization pulses, said system including means to transmit said synchronization pulses from said transmitter to said receiver, means at the transmitter to preset said counter means for operation from an original inoperative condition, means responsive to said horizontal synchronization pulses to start said preset counter means, means connected to and responsive to the start of said counter to produce and transmit to said receiver a marker pulse at a predetermined time, means to connect said transmitter vertical sweep pulse producing means to said counter to operate said transmitter vertical sweep pulse producing means in response to said marker pulse to start said vertical sweep pulse for scanning, said receiver having cathode-ray image-reproducing means including means producing a horizontal-sweep wave and a vertical-sweep pulse, and having counter means to count received horizontal synchronization pulses, input means responsive to the received marker pulse to preset the receiver counter means for operation from an original inoperative condition, means responsive to the received horizontal synchronizing pulses to start said preset counter, means to connect said receiver vertical sweep pulse producing means to said input means and responsive to the reception of said marker pulse by said input means to start said receiver vertical-sweep pulse for reproducing said image.

3. A single-frame facsimile transmission system comprising a transmitter and a receiver, said transmitter having image-scanning means including means producing a horizontal sweep wave, horizontal synchronization pulses and a vertical sweep pulse and having counter means to count said horizontal synchronization pulses, said system including means to transmit said synchronizing pulses from said transmitter to said receiver, means at the transmitter to preset said counter means for operation from an original inoperative condition, means responsive to said horizontal synchronization pulses to start said preset counter means, means responsive to said counter to produce and transmit a marker pulse at a predetermined time, and to start said vertical sweep pulse for scanning, said receiver having cathode-ray image-reproducing means including means producing a horizontal sweep wave and a vertical sweep pulse, and having counter means to count received horizontal synchronization pulses, means responsive to the received marker pulse to preset the receiver counter means for operation from an original inoperative condition and to start said receiver vertical sweep pulse for reproducing said image, means responsive to the received horizontal synchronization pulses to start said preset receiver counter, and means at said transmitter controlled by said transmitter counter means to modify selected scanned lines for secrecy purposes and means at said receiver controlled by said receiver counter means to modify lines in a complementary manner to reproduce the image in its original form.

4. A single-frame facsimile transmission system comprising a transmitter and a receiver, said transmitter having image-scanning means including means producing a horizontal sweep wave, horizontal synchronization pulses, a vertical sweep pulse and a blanking voltage, and having counter means to count said horizontal synchronization pulses, said system including means to transmit said synchronization pulses from said transmitter to said receiver, means at the transmitter to preset said counter means for operation from an original inoperative condition, means responsive to said horizontal synchronization pulses to start said preset counter means, means responsive to said counter means to produce and transmit a marker pulse, means responsive to said marker pulse to start said vertical sweep pulse for scanning and to interrupt said blanking voltage, means operative at the end of said vertical sweep pulse to restore said blanking voltage and to stop and reset said counter means to said original condition, said receiver having cathode-ray image-reproducing means including means producing a horizontal sweep wave, a blanking voltage and a vertical sweep pulse and having counter means to count said received horizontal synchronization pulses, input means responsive to the received marker pulse to preset said receiving counter means for operation from an original inoperative condition, means responsive to the received horizontal synchronizing pulses to start said preset receiving counter, means to connect said receiver vertical sweep pulse producing means to said input means and responsive to the reception of said marker pulse by said input means to start said receiver vertical sweep pulse and to interrupt said receiver blanking voltage for rendering said cathode-ray means operative, and means operative at the termination of said receiver vertical sweep pulse to restore said receiver blanking voltage and to stop and reset said receiving counter means to said original condition.

5. A single-frame facsimile transmission system comprising a transmitter and a receiver, said transmitter having image-scanning means including means producing a horizontal sweep wave, horizontal synchronization pulses, a vertical sweep pulse and a blanking voltage, and having counter means to count said horizontal synchronization pulses, said system including means to transmit said synchronizing pulses from said transmitter to said receiver, means at the transmitter to preset said counter means for operation from an original inoperative condition, means responsive to said horizontal synchronization pulses to start said preset counter means, means responsive to said counter means to produce and transmit a marker pulse, means responsive to said marker pulse to start said vertical sweep pulse for scanning and to interrupt said blanking voltage, means operative at the end of said vertical sweep pulse to restore said blanking voltage, and to stop and reset said counter means to said original condition, said receiver having cathode-ray image-reproducing means including means producing a horizontal sweep wave a blanking voltage and a vertical sweep pulse, and having counter means to count said received horizontal synchronization pulses, input means responsive to the received marker pulse to preset said receiver counter means for operation from an original inoperative condition, means responsive to the received horizontal synchronizing pulses to start said preset receiver counter, means to connect said receiver vertical sweep pulse producing means to said input means and responsive to the reception of said marker pulse by said input means to start said receiver vertical sweep pulse and to interrupt said receiver blanking voltage for rendering said cathode-ray means operative, and means operative at the termination of said receiver vertical sweep pulse to restore said receiver blanking voltage, and to stop and reset said receiver counter means to said original condition, and means at said transmitter controlled by its counter means to modify selected scanned lines for secrecy purposes, and at the receiver means to modify lines controlled by its counter means in a complementary manner to reproduce the image in its original form.

6. A single-frame facsimile transmission system comprising a transmitter and a receiver, said transmitter having image-scanning means including means producing a horizontal sweep wave, horizontal synchronization pulses, a vertical sweep pulse, and a blanking voltage, and having counter means to count said horizontal synchronization pulses, said system including means to transmit said synchronization pulses from said transmitter to said receiver, means at the transmitter to preset said counter means for operation from an original inoperative condition, means responsive to said horizontal synchronization pulses to start said preset counter means and to start the transmission to said receiver, means responsive to said counter means to produce and transmit a marker pulse, means responsive to said marker pulse to start said vertical sweep pulse for scanning and to interrupt said blanking voltage, means operative at the end of said vertical sweep pulse to restore said blanking voltage, stop and reset said counter means to said original condition and stop said transmission, said receiver having cathode-ray image-reproducing means, including means producing a horizontal sweep wave a blanking voltage and a vertical sweep pulse and having counter means to count said received horizontal synchronization pulses, camera means including a control shutter for photographing the reproduced image onto a film, input means responsive to the received marker pulse to preset said receiver counter means for operation from an original inoperative condition and to open said camera shutter, means responsive to the received horizontal synchronizing pulses to start said preset receiver counter, means to connect said receiver vertical sweep pulse producing means to said input means and responsive to the reception of said marker pulse by said input means to start said receiver vertical sweep pulse and to interrupt said receiver blanking voltage for rendering said cathode ray means operative, means operative at the termination of said receiver vertical sweep pulse to restore said receiver blanking voltage, stop and reset said receiver counter means to said original condition, and close said camera shutter.

7. A single-frame facsimile transmission system comprising a transmitter and a receiver, said transmitter having image-scanning means including means producing a horizontal sweep wave, horizontal synchronization pulses, a vertical sweep pulse, and a blanking voltage and having counter means to count said horizontal synchronization pulses, said system including means to transmit said synchronization pulses from said transmitter to said receiver, means at the transmitter to preset said counter means for operation from an original inoperative condition, means responsive to said horizontal synchronization pulses to start said preset counter means and to start the transmission to said receiver, means responsive to said counter means to produce and transmit a marker pulse, means responsive to said marker pulse to start said vertical sweep pulse for scanning and to interrupt said blanking voltage, means operative at the end of said vertical sweep pulse to restore said blanking voltage, stop and reset said counter means to said original condition and stop said transmission, said receiver having cathode-ray image-reproducing means including means producing a horizontal sweep wave, a blanking voltage and a vertical sweep pulse and having counter means to count said received horizontal synchronization pulses, camera means including a control shutter for photographing the reproduced image onto a film, input means responsive to the received marker pulse to preset said receiver counter means for operation from an original inoperative condition and to open said camera shutter, means responsive to the received horizontal synchronizing pulses and to the received marker pulse to start said preset receiver counter, means to connect said receiver vertical sweep pulse producing means to said input means and responsive to the reception of said marker pulse by said input means to start said receiver vertical sweep pulse and to interrupt said receiver blanking voltage for rendering said cathode-ray means operative, means operative at the termination of said receiver vertical sweep pulse to restore said receiver blanking voltage, stop and reset said receiver counter means to said original condition, and close said camera shutter, and means at said transmitter controlled by its counter means to modify selected scanned lines for secrecy purposes, and at the receiver means to modify lines controlled by its counter means in a complementary manner to reproduce the image in its original form.

8. A single-frame facsimile transmission system comprising a transmitter and a receiver, said transmitter having image-scanning means including means producing a horizontal sweep wave, horizontal synchronization pulses, a vertical sweep pulse and a blanking voltage, and having counter means to count said horizontal synchronization pulses, said system including means to transmit said synchronization pulses from said transmitter to said receiver, means at the transmitter to preset said counter means for operation from an original inoperative condition, means responsive to said horizontal synchronization pulses to start said preset counter means, means responsive to said counter means to produce and transmit a marker pulse, means responsive to said marker pulse to start said vertical sweep pulse for scanning and to interrupt said blanking voltage, means operative at the end of said vertical sweep pulse to restore said blanking voltage, and stop and reset said counter means to said original condition, said receiver having cathode-ray image-reproducing means including means producing a horizontal sweep wave, a blanking voltage and a vertical sweep pulse and having counter means to count said received horizontal synchronization pulses, camera means including a control shutter for photographing the reproduced image onto a film and advancing said film, input means responsive to the received marker pulse to preset said receiver counter means for operation from an original inoperative condition and to open said camera shutter, means responsive to the received horizontal synchronizing pulses to start said preset receiver counter, means to connect said receiver vertical sweep pulse producing means to said input means and responsive to the reception of said marker pulse by said input means to start said receiver vertical sweep pulse and to interrupt said receiver blanking voltage for rendering said cathode-ray means operative, means operative at the termination of said receiver vertical sweep pulse to restore said receiver blanking voltage, stop and reset said receiver counter means to said original condition, close said camera shutter and advance the camera film.

9. A single-frame facsimile transmission system comprising a transmitter and a receiver, said transmitter having image scanning means including means producing a horizontal sweep wave, horizontal synchronization pulses, a vertical sweep pulse and a blanking voltage, and having counter means to count said horizontal synchronization pulses, said system including means to transmit said synchronization pulses from said transmitter to said receiver, means at the transmitter to preset said counter means for operation from an original inoperative condition, means responsive to said horizontal synchronization pulses to start said preset counter means, means responsive to said counter means to produce and transmit a marker pulse, means responsive to said marker pulse to start said vertical sweep pulse for scanning and to interrupt said blanking voltage, means operative at the end of said vertical sweep pulse to restore said blanking voltage, and stop and reset said counter means to said original condition, said receiver having cathode-ray image-reproducing means including means producing a horizontal sweep wave, a blanking voltage and a vertical sweep pulse and having counter means to count said received horizontal synchronization pulses, camera means including a control shutter for photographing the reproduced image onto a film and advancing said film, input means responsive to the received marker pulse to preset said receiver counter means for operation from an original inoperative condition and to open said camera shutter, means responsive to the received horizontal synchronization pulses to start said preset receiver counter, means to connect said receiver vertical sweep pulse producing means to said input means and responsive to the reception by said input means of said marker pulse to start said receiver vertical sweep pulse and to interrupt said receiver blanking voltage for rendering said cathode-ray means operative, means operative at the termination of said receiver vertical sweep pulse to restore said receiver blanking voltage, stop and reset said receiver counter means to said original condition, close said camera shutter and advance the camera film, and means at said transmitter controlled by its counter means to modify selected scanned lines for secrecy purposes, and at the receiver means to modify lines controlled by its counter means in a complementary manner to reproduce the image in its original form.

10. A single-frame secrecy facsimile transmitter having image scanning means including means producing a horizontal sweep wave, horizontal synchronization pulses, a vertical sweep pulse, and a blanking voltage and having counter means to count said horizontal synchronization pulses, means at the transmitter to preset said counter means for operation from an original inoperative condition, means responsive to said horizontal synchronization pulses to start said preset counter means, means responsive to said counter means to produce and transmit a marker pulse, means responsive to said marker pulse to start said vertical sweep pulse for scanning and to interrupt said blanking voltage, and means operative at the end of said vertical sweep pulse to restore said blanking voltage and stop and reset said counter means to said original condition.

11. A single-frame secrecy facsimile transmitter having image-scanning means including means producing a horizontal sweep wave, horizontal synchronization pulses, a vertical sweep pulse, and a blanking voltage and having counter means to count said horizontal synchronization pulses, means at the transmitter to preset said counter means for operation from an original inoperative condition, means responsive to said horizontal synchronization pulses to start said preset counter means, means responsive to said counter means to produce and transmit a marker pulse, means responsive to said marker pulse to start said vertical sweep pulse for scanning and to interrupt said blanking voltage, and means operative at the end of said vertical sweep pulse to restore said blanking voltage, and stop and reset said counter means to said original condition, and means controlled by said counter means to modify selected scanned lines for secrecy purposes.

12. A single-frame secrecy facsimile receiver having cathode ray image reproducing means including means producing a horizontal sweep wave, a blanking voltage and a vertical sweep pulse and having counter means to count received horizontal synchronization pulses, camera means including a control shutter for photographing the reproduced image onto a film and advancing said film, input means responsive to a received marker pulse to preset said counter means for operation from an original inoperative condition and to open said camera shutter, means responsive to said received horizontal synchronization pulses to start said preset counter, means to connect said vertical sweep pulse producing means to said input means and responsive to the reception by said input means of said marker pulse to start said vertical sweep pulse to interrupt said blanking voltage for rendering said cathode-ray means operative, means operative at the termination of said vertical sweep pulse to restore said blanking voltage, stop and reset said counter means to said original condition, close said camera shutter and advance the camera film.

13. A single-frame secrecy facsimile receiver having cathode ray image reproducing means including means producing a horizontal sweep wave, a blank voltage and a vertical sweep pulse and having counter means to count received horizontal synchronization pulses, camera means including a control shutter for photographing the reproduced image onto a film and advancing said film, input means responsive to a received marker pulse to preset said counter means for operation from an original inoperative condition and to open said camera shutter, means responsive to said received horizontal synchronization pulses to start said preset counter, means to connect said vertical sweep pulse producing means to said input means and responsive to the reception of said marker pulse by said input means to start said vertical sweep pulse and to interrupt said blanking voltage for rendering said cathode-ray means operative, means operative at the termination of said vertical sweep pulse to restore said blanking voltage, stop and reset said counter means to said original condition, close said camera shutter and advance the camera film, and means controlled by said counter means to modify scanned lines received by said receiver in a manner complementary to the modifications which have previously been made for secrecy purposes.

14. A single-frame facsimile transmission system comprising a transmitter and a receiver, said transmitter having electronic image-scanning means including means producing a horizontal-sweep wave, a vertical-sweep pulse, synchronization and blanking voltage pulses, and having counter means to count said synchronization pulses, said receiver having cathode-ray image-producing means including means producing a horizontal-sweep wave, a vertical-sweep pulse and a blanking voltage, and having counter means for counting said synchronization pulses received from said transmitter, the transmitter having means to start from an original inoperative condition its counter means, and after a predetermined time in response to the operation of said transmitter counter means to start said transmitter vertical sweep pulse and to interrupt said transmitter blanking voltage, and means at said transmitter to transmit a video signal and a horizontal-blanking wave produced by scanning of the image, said receiver having means responsive to said synchronization pulses to synchronize said receiver horizontal-sweep wave with said transmitter horizontal-sweep wave, and means responsive to said synchronization pulses and said transmitter counter to start said receiver counter from an original inoperative condition in step with said transmitter counter, and to start the receiver vertical-sweep pulse and to interrupt said receiver blanking voltage, and means to receive said transmitted video and horizontal-blanking waves and to control said cathode-ray image-producing means to produce an image, and at both transmitter and receiver means responsive to said respective vertical-sweep pulses to reset said respective counters, blanking voltages, and vertical-sweep pulses to original conditions.

15. A single-frame facsimile transmission system comprising a transmitter and a receiver, said transmitter having electronic image-scanning means including means producing a horizontal-sweep wave, a vertical-sweep pulse, synchronization and blanking voltage pulses, and having counter means to count said synchronization pulses, said receiver having cathode-ray image-producing means including means producing a horizontal-sweep wave, a vertical-sweep pulse and a blanking voltage, and having counter means for counting synchronization pulses received from said transmitter, the transmitter having means to start its counter means from an original inoperative condition, and after a predetermined time to start said transmitter vertical sweep pulse and to interrupt said transmitter blanking voltage, and means to transmit a video signal and a horizontal-blanking wave produced by scanning of the image, said receiver having means responsive to said synchronization pulses to synchronize said receiver horizontal-sweep wave with said transmitter horizontal-sweep pulses, and means responsive to said synchronization wave and said transmitter counter to start said receiver counter from an original inoperative condition in step with said transmitter counter, and to start the receiver vertical-sweep pulse and to interrupt said receiver blanking voltage, and means to receive said transmitted video and horizontal-blanking waves and to control said cathode-ray image-producing means to produce an image, and at both transmitter and receiver means responsive to said respective vertical-sweep pulses to reset said respective counters, blanking voltages, and vertical-sweep pulses to original conditions, and means at said transmitter controlled by its counter means to modify selected scanned lines for secrecy purposes, and at the receiver means to modify lines controlled by its counter means in a complementary manner to reproduce the image in its original form.

References Cited in the file of this patent

UNITED STATES PATENTS

| | | |
|---|---|---|
| 2,177,365 | Goldmark | Oct. 24, 1939 |
| 2,547,598 | Roschke | Apr. 3, 1951 |
| 2,697,741 | Roschke | Dec. 21, 1954 |
| 2,707,207 | De Baun | Apr. 26, 1955 |

FOREIGN PATENTS

| | | |
|---|---|---|
| 346,456 | Great Britain | Mar. 30, 1931 |

UNITED STATES PATENT OFFICE

CERTIFICATE OF CORRECTION

June 2, 1959

Patent No. 2,889,399

John Hays Hammond, Jr.

It is hereby certified that error appears in the printed specification of the above numbered patent requiring correction and that the said Letters Patent should read as corrected below.

Column 7, line 31, for "and" read -- said --; column 8, line 12, after "preset" insert -- receiver --; column 12, line 50, for "blank" read -- blanking --.

Signed and sealed this 22nd day of December 1959.

(SEAL)
Attest:

KARL H. AXLINE
Attesting Officer

ROBERT C. WATSON
Commissioner of Patents